(12) United States Patent
Salgado (10) Patent No.: US 7,580,936 B2
(45) Date of Patent: Aug. 25, 2009

(54) EXTENDABLE DISCOVERY OF NETWORK DEVICE INFORMATION

(75) Inventor: David Salgado, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 389 days.

(21) Appl. No.: 11/094,976

(22) Filed: Mar. 31, 2005

(65) Prior Publication Data

US 2006/0230060 A1 Oct. 12, 2006

(51) Int. Cl.
G06F 17/30 (2006.01)
(52) U.S. Cl. ...................................... 707/10
(58) Field of Classification Search ............. 707/10
See application file for complete search history.

(56) References Cited

U.S. PATENT DOCUMENTS

| | | | |
|---|---|---|---|
| 5,572,640 A | 11/1996 | Schettler | |
| 5,901,286 A | 5/1999 | Danknick et al. | |
| 5,913,037 A | 6/1999 | Spofford et al. | |
| 6,043,909 A | 3/2000 | Holub | |
| 6,055,063 A | 4/2000 | Yang et al. | |
| 6,157,735 A | 12/2000 | Holub | |
| 6,182,225 B1 | 1/2001 | Hagiuda et al. | |
| 6,360,258 B1 | 3/2002 | LeBlanc | |
| 6,694,304 B1 | 2/2004 | Sethi | |
| 6,769,124 B1 * | 7/2004 | Schoening et al. | 719/316 |
| 6,898,276 B1 * | 5/2005 | Millet et al. | 379/219 |
| 6,961,335 B1 * | 11/2005 | Millet et al. | 370/356 |
| 2003/0101223 A1 * | 5/2003 | Pace et al. | 709/206 |
| 2003/0156552 A1 * | 8/2003 | Banker et al. | 370/266 |
| 2005/0223109 A1 * | 10/2005 | Mamou et al. | 709/232 |

* cited by examiner

*Primary Examiner*—Diane Mizrahi
(74) *Attorney, Agent, or Firm*—Michelle Waites (57) ABSTRACT

A network management protocol can be used to enable a user to determine what features, functions and other characteristics are supported by a networked device and to extend the capabilities of the device without having to modify the existing software. While available systems and methods use the generic profiles that are provided with each client application, present systems and methods can be used to tailor client applications for use by a specific device. Accordingly, subsequent versions of a client application can provide new functionality to devices that have already been connected to the network.

16 Claims, 5 Drawing Sheets

EXTENDABLE DISCOVERY OF NETWORK DEVICE INFORMATION

TECHNOLOGY

Present systems and methods relate to identifying and extending the discoverable features for a specified device that is connected to a computer network.

BACKGROUND

A network generally includes a number of devices connected to allow inter-device communication. Networked devices are often provided by multiple vendors that have expertise manufacturing different types of devices. Networks and networked devices have become increasingly complex and thus, it has become increasingly important to be able to monitor the status and performance of all of the devices that are connected to the network. Accordingly, networks typically include at least one network management station that can be used to monitor and manage the network.

Generally, networks manage the transmission of data among the devices using a network protocol. While network communications take place in many ways, many networks use one of a few widely known standards that are known to facilitate efficient communication among unrelated devices. For example, networks throughout Europe commonly operate under the Common Management Information Protocol (CMIP), while use of the Simple Network Management Protocol (SNMP) is more common in the United States. The capabilities of a given network will typically be limited by the functionality that is supported by its communication protocol.

SNMP is a network communication standard that provides a data transmission protocol, a structure for an object-oriented management information database (MIB) and a set of well defined data objects. SNMP objects define the status and characteristics for a selected network device. They are identified by an object identifier (OID) that defines the path through the database structure that leads to the object. Each target device on the network runs a network agent that maintains a MIB of objects corresponding to discoverable information supported by that device.

To obtain device information, the network manager typically identifies the network agent running on the target device, determines the type of information maintained in the device and sends the network agent the OID for the desired information with an instruction to either get or modify the value of the object. The network agent responds by accessing its MIB and retrieving/modifying the value of the object corresponding to OID or if the OID is not recognized, sending the network manager an error message indicating that the requested information is non-discoverable.

To identify the all of the discoverable information for a target device, a network manager would have to walk through the objects in the MIB one-by-one using a string of "get-next" requests. More specifically, the network manager could send the network agent a "get" request that includes the first OID, then send repeated "get-next" requests to obtain all of the discoverable information for the target device. There is currently no way to obtain a list of all of the OIDs for the objects corresponding to discoverable information for a specified networked device in response to a network manager request.

Further, the MIB for each device is typically configured solely by the device manufacturer. Thus, while it may be possible to discover a significant amount of information about a device, the network manager cannot obtain any information that does not correspond to an object that the manufacturer has included in its MIB.

It would be advantageous to provide a way for a network manager to obtain a list of all of the objects for discoverable information supported by a specified target device and to be able to access information that is not originally associated with objects that are initially contained in the MIB for the device.

REFERENCES

Information is "discoverable" when it is represented by an object stored in the management information database for a target device with an associated object identifier. Information is "non-discoverable" when it relates to device information about a device that is not represented by an object maintained the management information database with an associated object identifier.

U.S. Pat. No. 6,360,258 discloses a method of providing multiple variable retrievals and setting within one SNMP request. The method forms packet data units with object identifiers (OIDs). The OIDs are packet specific for a particular request in an object management system using SNMP (simple network management protocol) attributes, the object management system including a plurality of objects and procedures for accessing the objects. The object management system is accessible over a network and associated with a network-attached device. The method includes providing the object management system with a plurality of classes providing descriptions of things that can be accessed.

U.S. Pat. No. 6,055,063 discloses a utility that defines additional attributes that would cater to the needs of a user, which provides dynamically extended printing capabilities. The system architecture allows the information to be pushed down transparently to the receiving end, which understands the semantics of the given information. One possible function of the system administrators can be to define information to monitor for accounting purposes. The utility allows additional printer features to be incorporated without disrupting the existing system.

U.S. Pat. No. 5,913,037 discloses a MIB manager including set of software interfaces, semantics, procedures and data structures that work together as a system to dynamically manage a tree of SNMP data objects identified by a standard object identifier (OID) along with each object's value. An agent uses the interface of the MIB manager to add and delete MIB objects by OID. When one or more new objects are added to the MIB tree, the agent provides the MIB manager with references to subroutines within the agent and external to the MIB manager, which subroutines operate to manage the identified objects by monitoring and controlling the objects' values.

SUMMARY

Aspects of present systems and methods provide a method that includes receiving, at a target device on a computer network, a request for a list of identifiers that are associated with a plurality of objects that are available for export from the target device; using a database managed by the target device, generating a list of identifiers for the plurality of export available objects; and sending the generated list to a remote device on the computer network.

In one aspect, an object-oriented database includes a plurality of objects that are available for export from an electronic device; and a plurality of object identifiers, each of which corresponds to one of the plurality of objects, wherein at least one of the plurality of object identifiers can be used to export a list of object identifiers corresponding to a plurality of the objects.

In another aspect, a computer network includes a network management station configured to run a network manager that is arranged to transmit and receive object identifiers over the computer network; a target device in electronic communication with the network management station, the target device running a network agent that is configured to receive the object identifiers from the network manager and to transmit objects associated with the object identifiers to the network manager, the network agent being further configured to maintain an object oriented database of the objects and associated object identifiers, wherein each of the objects provides management information relating to the target device.

In yet another aspect, an electronic device includes electronic circuitry configured to communicate with a remote device; a processor; and a memory having an object-oriented database and a network agent stored therein, the object-oriented database containing a plurality of objects, each of which is associated with a unique object identifier, the network agent being configured to export the objects from the object-oriented database, wherein at least one of the plurality of object identifiers can be used by the network agent to export a list of object identifiers corresponding to a plurality of the database objects.

DETAILED DESCRIPTION

For a general understanding of the present systems and methods, reference is made to the drawings. In the drawings, like reference numerals have been used throughout to designate identical elements. In describing the present systems and methods, the following term(s) have been used in the description:

A "protocol" refers to a pre-defined method used by networked devices to used by networked devices to exchange information.

A "network management station" refers to a computer that is operated by a human user to monitoring the status of the devices on a computer network.

A "target device" is a managed node, such as a printer, computer, scanner, etc., that is linked to a computer network.

A "network agent" is a software program running as a background process on a target device that receives and responds to requests for information about the target device.

A "network manager" is a software program available on a network management station that is capable of setting objects in a network agent running on a target device.

An "object" is an item of data that provides the status of a feature, function or other characteristic about an electronic device, with associated methods for modifying it.

An "object identifier (OID) is a sequence of non-negative integer values that signifies the path through a database structure that leads to a selected object.

An object is "available for export" when it is stored in the management information database for a target device with an associated object identifier and can be retrieved from the MIB when requested by a network manager. An object is "not available for export" when it relates to information about a device that can be obtained but it is not present in the management information database with an associated object identifier at the time it is requested by the network manager.

An "object identifier list" is a register of object identifiers. Accordingly, "available object list object" is an object that provides a register of object identifiers that are available for export from the management information database of a target device. An "available object list OID" is the object identifier associated with an available object list object.

An "add exportable object" is an object used to add a new object to a management information database. An "add exportable OID" is the object identifier associated with an add exportable object.

Figure 1:
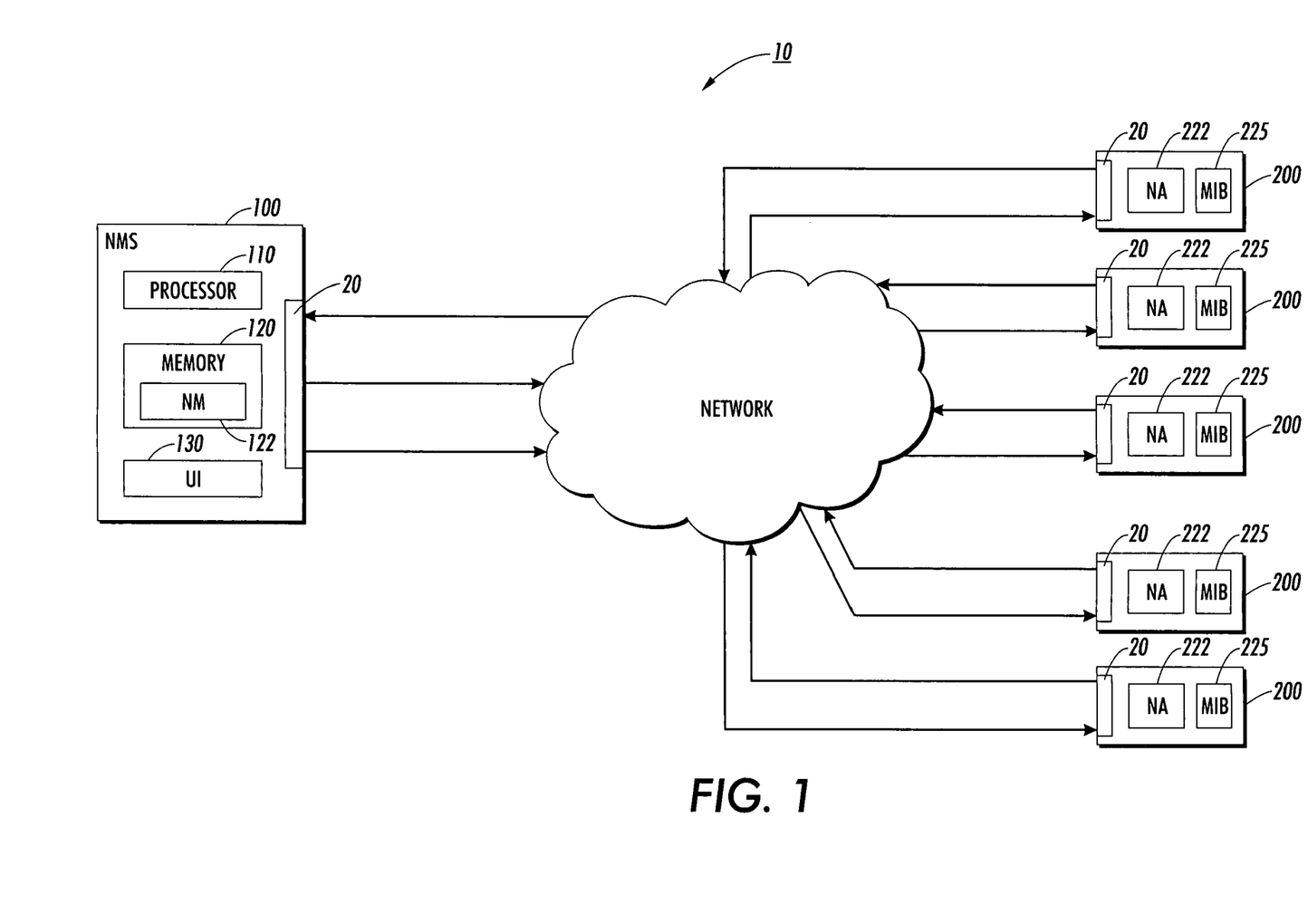
FIG. 1 is a general illustration of a computer network with several target devices linked for electronic communication.

Referring now to FIG. 1, a block diagram is shown of a network 10 with a plurality of electronic devices that are linked for electronic communication. In the example shown, the devices that are linked to network 10 include a network management station (NMS) 100 and a plurality of target devices 200, which may be, for example, printers, plotters, fax machines, computer workstations, file and print servers and/or networking resources and devices, such as, repeaters, switches, routers, routers hubs, concentrators, nodes, etc. NMS 100 and each of the target devices 200 has a network interface 20 and is configured to communicate with network 10 using the Simple Network Management Protocol (SNMP). While present systems and methods are illustrated herein using SNMP, it is understood, that other network protocols may be used and that systems and methods that are described are not limited use with to network systems and that in fact, they may be applied to any type of device to be managed.

NMS 100 includes a processor 110 that is capable of executing one or more software programs that are stored in memory 120. One such program is a client application known as a network manager (NM) 122, which manages objects 123 that are maintained in the MIBs 225 of networked target devices 200. In the example shown, NMS 100 also has a user interface (UI) 130 where data can be entered by and displayed to a user at NMS 100.

Each target device 200 on the network runs a network agent (NA) 222 that maintains an object oriented management information base (MIB) 225 of objects that correspond to discoverable information supported by that target device 200. NM 122 monitors and manages network devices by sending SNMP requests, each of which includes one or more OIDs 127, to the NA 222 running on target devices 200. NA 222 responds by accessing the associated MIB 225 and reading or modifying the object 123 corresponding to OID 127.

Figure 2:
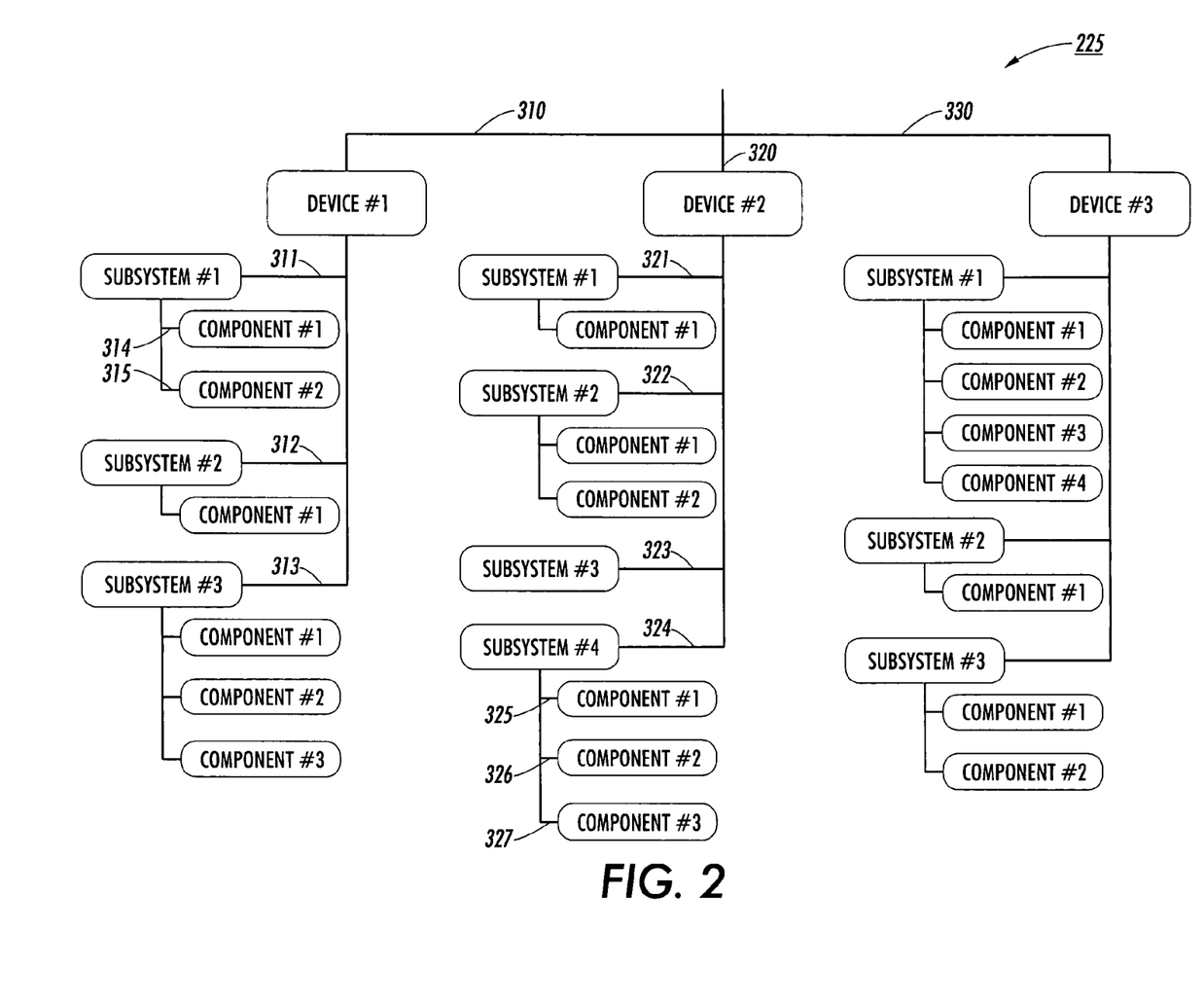
FIG. 2 is a block diagram showing a MIB formatted as a tree structure

In the example shown in FIG. 2, MIB 225 is implemented as a tree structure and each object 123 is associated with an object identifier (OID) 127 that defines the path that leads to the associated object 123. However, it is understood that MIB 225 could be formatted in other ways.

For example, an object 123 associated with a first component of a first subsystem of a first target device 200 may be identified by OID 1.1.1, which means it will be located by following top level path 310 to the device identified by ID #1, then following branch 311 at the next level to the subsystem identified by ID #1 and finally, following branch 314 at the last level to the component identified by ID #1. Similarly, OID 2.4.3 that identifies an object 123 associated with a third component of a fourth subsystem of a second target device 200 may be located by following top level path 320 to the device identified by ID #2, then following branch 324 at the next level to the subsystem identified by ID #4, then following branch 327 at the next level to the component identified by ID #3. As shown, all of the OIDs 127 that relate to a single device begin with an identical series of numbers and branch out to address different functions.

Objects in MIB 225 relate to the functions that are supported by target devices 200. The structure of a MIB 225 is typically established by the device manufacturer. Thus, while it may be possible to obtain numerous types of information about a device, the network manager cannot obtain any information relating to features, functions, etc. unless the manufacturer has provided a corresponding object in MIB 225. Thus, while NM 122 continuously monitors and modifies the values that are assigned to objects 123, objects are not automatically added to, removed from or modified in MIB 225 as target devices 200 are upgraded or reconfigured to provide modified features.

Figure 3:
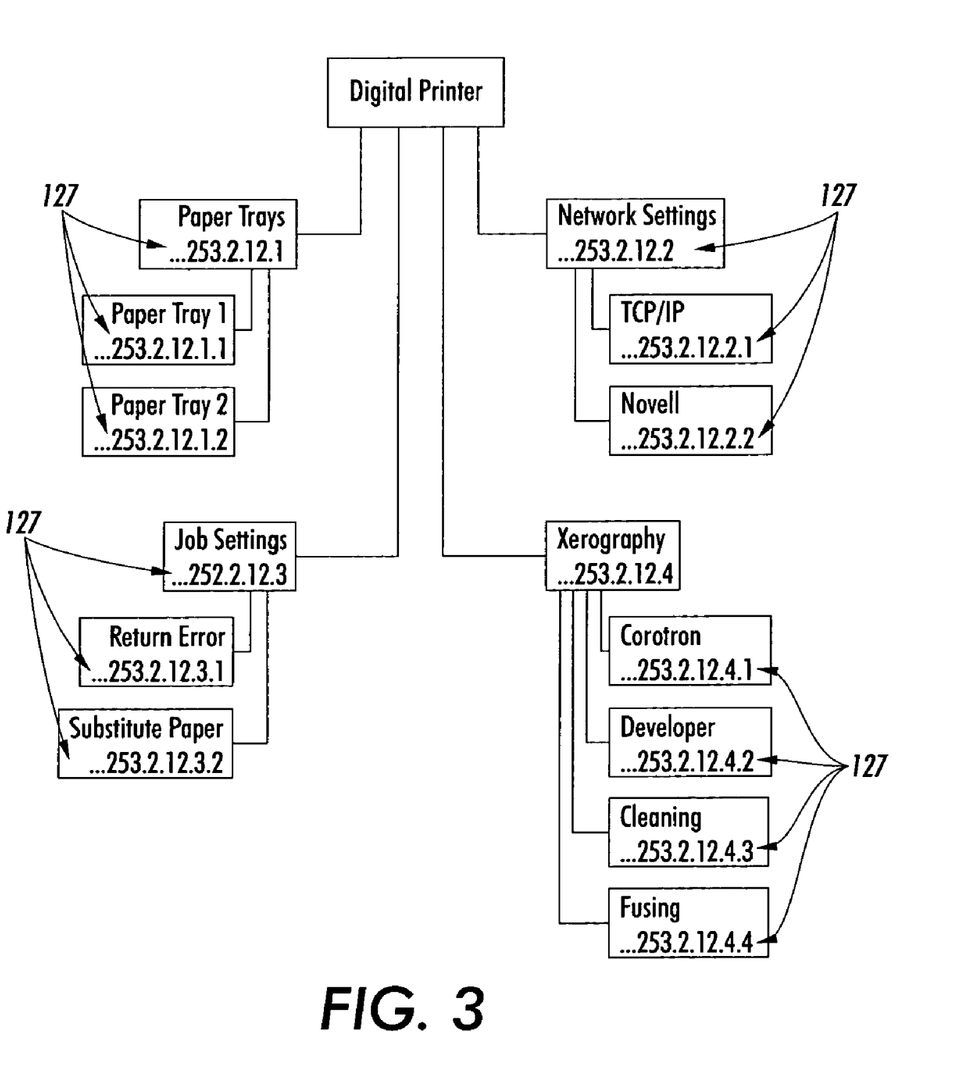
FIG. 3 is a flow diagram showing aspects of a network management system using database objects that are included in present systems and methods.

Turning to FIG. 3, an OID 127 will typically begin with a series of numbers that identifies the type of device being managed and its manufacturer. For example, a typical OID 127 begins with several standard SNMP identifiers that are followed by a series of digits that identifies the manufacturer of the respective target device 200. In the case of a digital printer, OID 127 will often include identifiers that are used to access objects that relate to paper trays, staplers and other components, xerographic and other subsystems, network settings, job settings, etc. In the example shown, all the OIDs 127 for the selected printer begin with the same series of numbers (e.g., 1.3.6.1.4.1.253.2.12) and different printer functions are addressed by the remaining identifiers. More specifically, all objects relating to printer network settings end in "1.X," with TCP/IP settings ending in "1.1" and Novell settings end in "1.2," while all objects relating to paper trays end in "2.X," all objects relating to job settings end in "3.X" and all objects relating to the components of the Xerographic subsystem end in "4.X."

Figure 4:
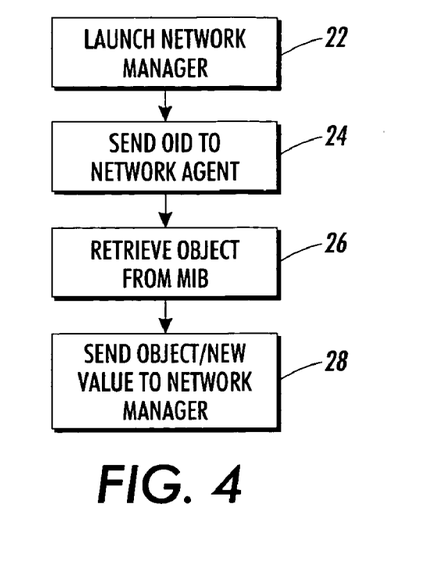
FIG. 4 is a flow diagram illustrating generally, one way to obtain information about a target device on a network.

Turning to FIG. 4, to obtain information for a target device 200, an operator will launch NM 122 as shown at block 22 by entering commands at NMS 110. As shown in block 24, NM 122 forwards a request for the desired object to NA 222 running on the selected printer using the appropriate OID 127. NA 222 then retrieves the associated object as shown in block 26 and sends it to NM 110 as shown in block 28.

Present systems and methods allow NM 122 to tailor itself to a specific target device 200. In one aspect, present systems and methods provide a first customized object 128 that can be sent to NA 222 to request a list of the OIDs 127 for a plurality of objects that can be discovered about the associated target device 200. In one aspect, customized object 128 causes NA 222 to list the OID 127 for every object that is supported by the device. Accordingly, the user operating NM 122 can determine whether the selected target device 200 is currently capable of exporting the required objects 123. In another aspect, present systems and methods provide a second customized object 129 that enables NM 122 to enter the sequence of identifiers that provide the OID 127 for a desired object 123.

In one aspect, present systems and methods can be used to determine all of the discoverable information for an existing target device. In another aspect, present systems and methods can be used to enable a NM to extend the set of discoverable information for a target device. In this aspect, the ability to extend the set of exported device information can be limited to NMs that have appropriate access rights.

Generally, present systems and methods provide one or more additional OIDs 127 that can be used to request discoverable information for all target devices on the network.

Figure 5:
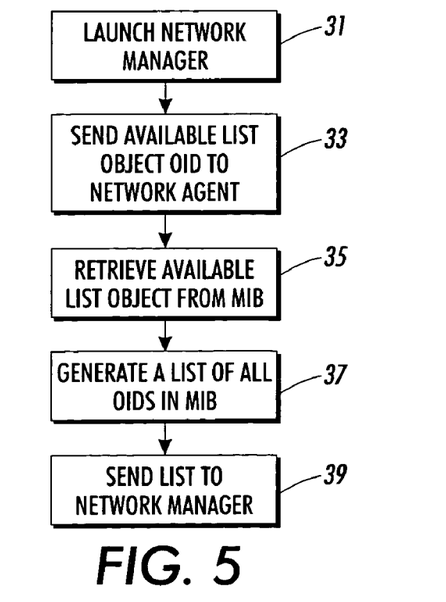
FIG. 5 is a flow diagram showing an example of how a network manager can obtain a list of identifiers for objects that are supported by target devices on a network.

In one aspect, present systems and methods provide an Available Object List OID 127A, which NM 122 can use to obtain a list of all of the OIDs for objects associated with discoverable information for a target device 200. Turning to FIG. 5, the operator launches NM 122 as shown at block 31 and NM 122 submits a request to NA 222 running on the selected printer that includes Available Object List OID 127A as shown in block 33. When NA 222 receives the request, it accesses its LMIB 225 and retrieves Available Object List Object 123A as shown in block 35. Available Object List Object 123A retrieves the OID 127 for each object in MIB 225 associated with target device 200 and produces a list of all of the available OIDs 127 as shown in block 37. NA 222 then sends the list to NM 110 as shown in block 39. Accordingly, use of Available Object List OID 127A enables NM 122 to determine whether the desired data can be discovered for target device 200.

It is noted that if targeted device 200 is upgraded or modified, the OIDs 127 for any new objects 123 will be added to the local database. Accordingly, if NM 122 re-sends Available Object List OID 127A to NM 222, the list that is generated and sent to NM 122 will include the new OIDs. It is also noted that while present systems and methods are described as being used to obtain a list of all of the OIDs for objects corresponding to discoverable information for a target device 200, they could also be used to provide one or more subsets of OIDs that are selected by a user operating NM 122.

In another aspect, present systems and methods provide an Add Exportable Object OID 127B, which can be used to enable NM 122 to add an OID 127 for an object 123 relating to information that is available to a target device and thus, could be discoverable information for target device 200 by adding its OID 127 to the local database. For example, in the context of a digital printer, present systems and methods may be used to allow NA 222 to export network settings for a printer that was previously used only locally.

Figure 6:
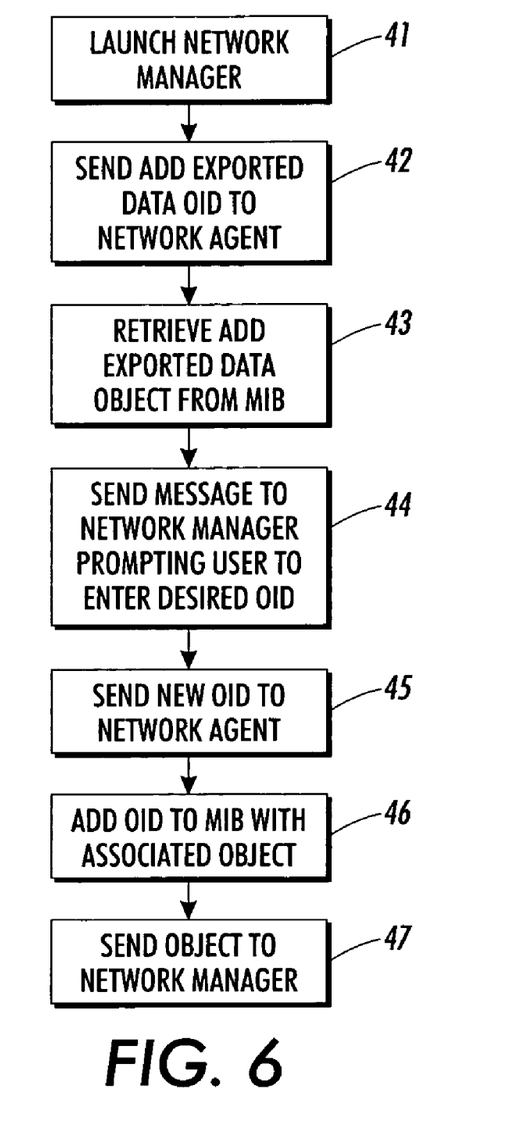
FIG. 6 is a flow diagram showing an example of how a network manager can add identifiers for objects that can be supported by target devices on a network.

Turning to FIG. 6, an operator can launch NM 122 as shown at block 41 and submit a request to NA 222 running on the selected printer that includes Add Exportable Object OID 127B as shown in block 42. When NA 222 receives the request, it accesses MIB 225 and retrieves Add Exportable Object 123B as shown in block 43 and returns it to NM 122 as shown in block 44. In one aspect, object 123B causes a message to be displayed at NMS 110 that prompts the user to enter the OID 127 that is to be added to MIB 225 with the desired information.

In one aspect, the OID 127 that has been entered by the user is recognized by NA 222 and it is stored it in the local database with the associated object 123. If the OID 127 entered by the user is not recognized by target device 200, NA 222 can respond by sending an error message to NM 122.

In another aspect, the request submitted by the user at block 42 includes Add Exportable Object OID 127B and also includes a semantic definition of the information that is to be exported from target device 200 when the newly added OID 127 is sent to NA 222. This semantic information can be encoded, for example, in a simple language (e.g. XML-based) that is understood by target device 200.

A single network 10 will often include several NMs 122, to distribute the workload among available operators to enable operators in different locations to manage target devices 200. Accordingly, NA 222 must typically perform some form of security validation to guarantee that NM 122 has the authority to modify its local database. In another aspect, present systems and methods can be used to enable a target device to classify each OID in the local database and fulfill only those requests that are submitted by a NM 122 that has the appropriate access rights.

For example, OIDs 127 could be placed in one of two categories: Category Public, which is accessible to all clients or Category Privileged, which is only accessible to clients with extended access rights. Accordingly, only select clients (with the necessary access rights) could use the extended set of OIDs. For example, it may be desirable to place Add Exportable Object OID 127B in Category Privileged so only certain operators have the ability to add new OIDs to MIBs 225.

In another aspect, it may be desirable to provide an Available Public Object List OID 127C and an Available Private Object List OID 127D, rather than a single Available Object List OID 127A so when a user requests a list of OIDs 127 for objects that correspond to discoverable information for a target device 200, users with partial access rights will only receive a list of OIDs 127 that they can actually use, while users with full access rights will receive the entire list of OIDs 127.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method, comprising:
receiving, at a target device on a computer network, a request for discoverable information from said target device;
generating, from a management information database stored in a memory accessible to said target device, a list of identifiers associated with objects that provide said discoverable information;
sending said object identifier list from said target device to a remote device on said computer network;
receiving, at said target device, a request for non-discoverable information from said target device;
adding to said management information database, an object relating to said non-discoverable information and an identifier associated with said non-discoverable information related object; and
sending an identifier associated with said non-discoverable information associated object from said target device management information database to a remote device on said computer network.

2. A method as claimed in claim 1 further comprising segregating said management information database object identifiers into a plurality of classes, with at least one of said classes requiring validation of a device transmitting said request to generate said object identifier list.

3. A method as claimed in 2 further comprising:
receiving an available a discoverable object list OID from a network manager;
validating an identity of said network manager;
upon said network manager identity validation, generating a list of objects associated with said available discoverable object list OID that are contained in said management information database; and
sending said available discoverable object identifier list to said network manager.

4. A method as claimed in claim 1 wherein said discoverable information request includes a request for a list of all OIDs associated with objects that are maintained in said management information database.

5. A method as claimed in claim 4, further comprising:
receiving an available a discoverable object list OID from a network manager;
retrieving an available a discoverable object list object associated with said available object list OID from said management information database, said available discoverable object list object being configured to retrieve from said management information database, an OID for each object relating to discoverable information that is available for export from for said target device and to produce a list of said export available discoverable object OIDs; and
sending said list of export available discoverable object OIDs to said network manager.

6. A method as claimed in claim 1, further comprising:
receiving an add object identifier OID from a network manager;
retrieving an add object identifier object from said management information database;
sending said add object identifier to said network manager;
receiving a second OID from said network manager;
adding an object associated with said second OID to said management information database; and
sending said object associated with said second OID to said network manager.

7. A method as claimed in claim 6, further comprising:
with said add object identifier OID, receiving a definition of an object to be added to said management information database;
associating said second OID with said defined object; and
adding said second OID and said defined object to said management information base.

8. A computer network, comprising:
a network management station configured to run a network manager arranged to transmit and receive object identifiers over the computer network;
a target device in electronic communication with said network management station, said target device running a network agent configured to receive said object identifiers from said network manager and to transmit objects associated with said object identifiers to said network manager, said network agent being further configured to access an object oriented database stored in a memory accessible to said target device, wherein said object oriented database includes objects for discoverable management information relating to said target device and identifiers associated with each of said discoverable objects, said object oriented database being configured to add objects for non-discoverable management information relating to said target device and identifiers associated with said non-discoverable objects.

9. A computer network as claimed in claim 8 wherein said at least one of said object identifiers is configured to provide a list of all object identifiers corresponding to objects in said management information database.

10. A computer network, comprising:
a network management station configured to run a network manager arranged to transmit and receive object identifiers over the computer network;
a target device in electronic communication with said network management station, said target device running a network agent configured to receive said object identifiers from said network manager and to transmit objects associated with said object identifiers to said network manager, said network agent being further configured to maintain an object oriented database of said objects and associated object identifiers, wherein each of said objects provides discoverable management information relating to said target device, with at least one of said object identifiers being configured to provide a list of all object identifiers corresponding to objects in said management information database wherein at least one of said object identifiers is configured to enable said network agent to accept an identifier associated with object corresponding to non-discoverable information for said target device and add said accepted identifier to said management information database with said associated object.

11. A computer network as claimed in claim 10, further comprising:
receiving discoverable object list object identifier from a network manager;
accessing said management information database;
retrieving a discoverable object list object from said management information database, said discoverable object list object being configured to retrieve an object identifier for each object in said management information database defining discoverable information for a networked device and produce said retrieved object identifiers in a list; and
sending said object identifier list to said network manager.

12. A computer network as claimed in claim 10, further comprising:
receiving an add discoverable object identifier from a network manager;
accessing a management information database;
retrieving an add discoverable object from said management information database;
sending said retrieved add discoverable object to said network manager;
receiving a device object identifier from said network manager; retrieving a device object associated with said received device object identifier from said management information database; and
sending said retrieved device object to said network manager.

13. A computer network as claimed in claim 10 further comprising segregating said target device management information database object identifiers into a plurality of classes, with at least one of said classes requiring security validation in order to provide access to said associated objects.

14. A computer network as claimed in 13 further comprising:
receiving a discoverable object list object identifier from a network manager;
validating an identify of said network manager;
upon validating said network manager identify, accessing a target device management information database;
retrieving a discoverable object list object from said management information database, said discoverable object list object being configured to retrieve the object identifier for each object in said management information database defining discoverable information for a networked device and produce the associated object identifiers in a list; and
sending said object identifier list to said network manager.

15. An electronic device, comprising:
an electronic circuitry configured to communicate with a remote device;
a processor; and
a memory having an object-oriented database and a network agent stored therein, said object-oriented database containing a plurality of objects, each of which is associated with a unique object identifier, said network agent being configured to export objects from said object-oriented database, wherein at least one of said plurality of object identifiers can be used by said network agent to compile a list of object identifiers corresponding to a plurality of said database objects for export to said remote device, wherein at least one of said object-oriented database object identifiers is configured to export a list of all object identifiers corresponding to said database objects and at least one of said plurality of object-oriented database object identifiers is configured to enable said network agent to accept an object identifier associated with a non-discoverable object and add said accepted identifier to said object-oriented database with said accepted identifier associated object.

16. An electronic device as claimed in claim 15 wherein said at least one of said plurality of object identifiers is configured to receive a discoverable object list object identifier from a network manager, access a target device management information database and retrieve a discoverable object list object from said management information database, said discoverable object list object being configured to retrieve an object identifier associated with each discoverable object list object in said management information database and produce a list of said discoverable object list object identifiers; and send said object identifier list to said network manager.

* * * * *